Nov. 4, 1930.  W. T. SKINNER  1,780,509
FLASH DEVICE
Filed March 23, 1929   3 Sheets-Sheet 2
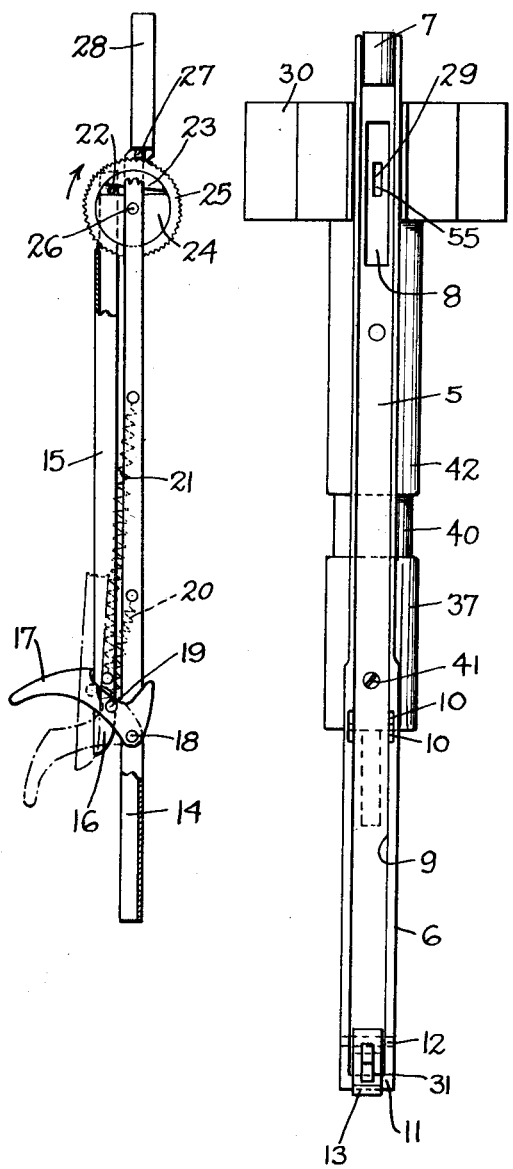
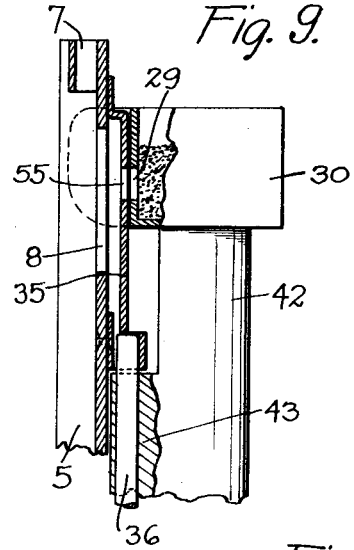
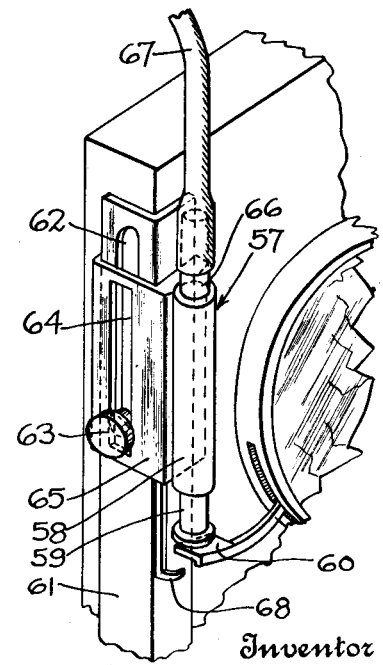
Inventor
WILLIAM T. SKINNER
By His Attorney
John J. Lynch

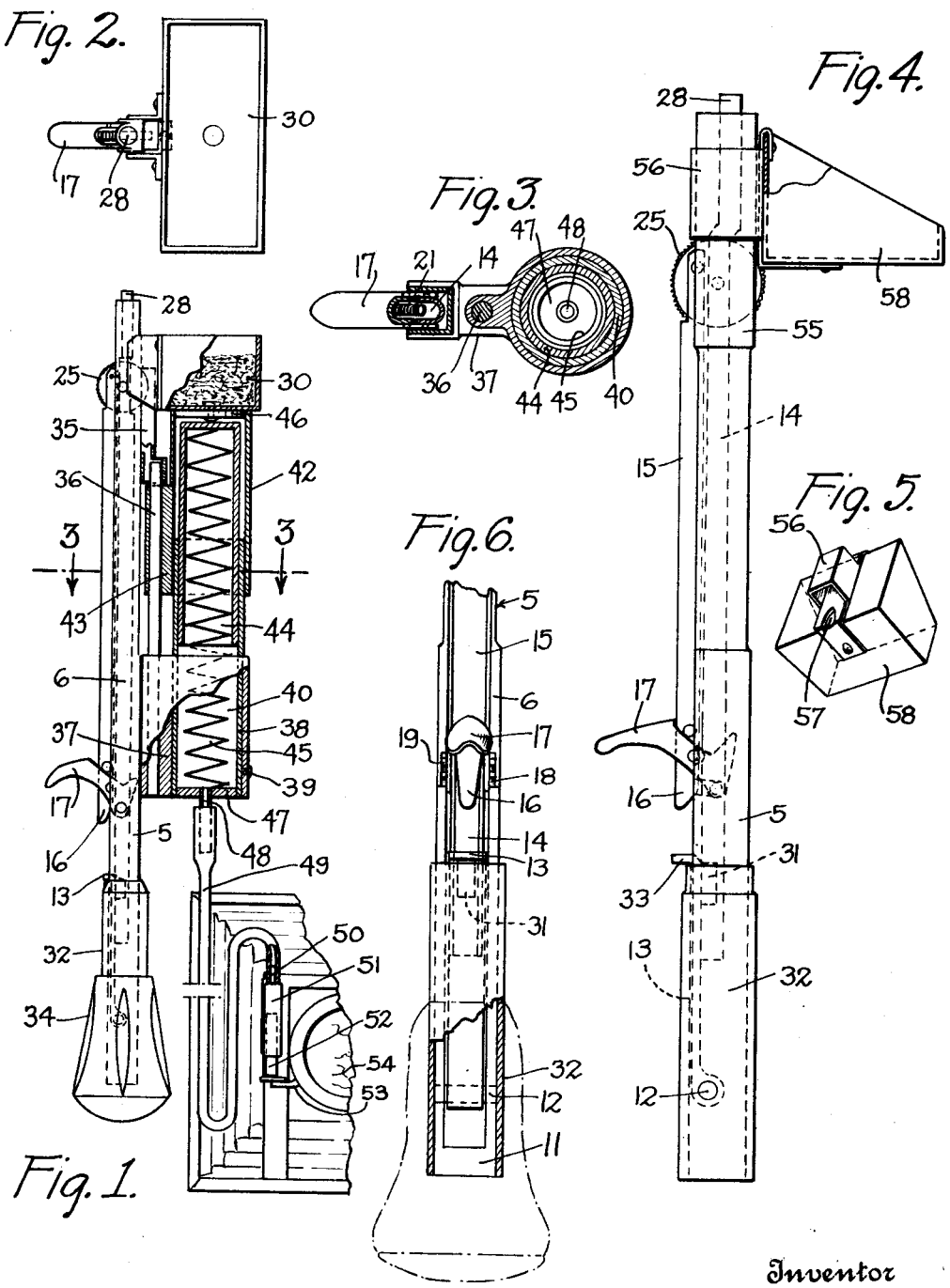

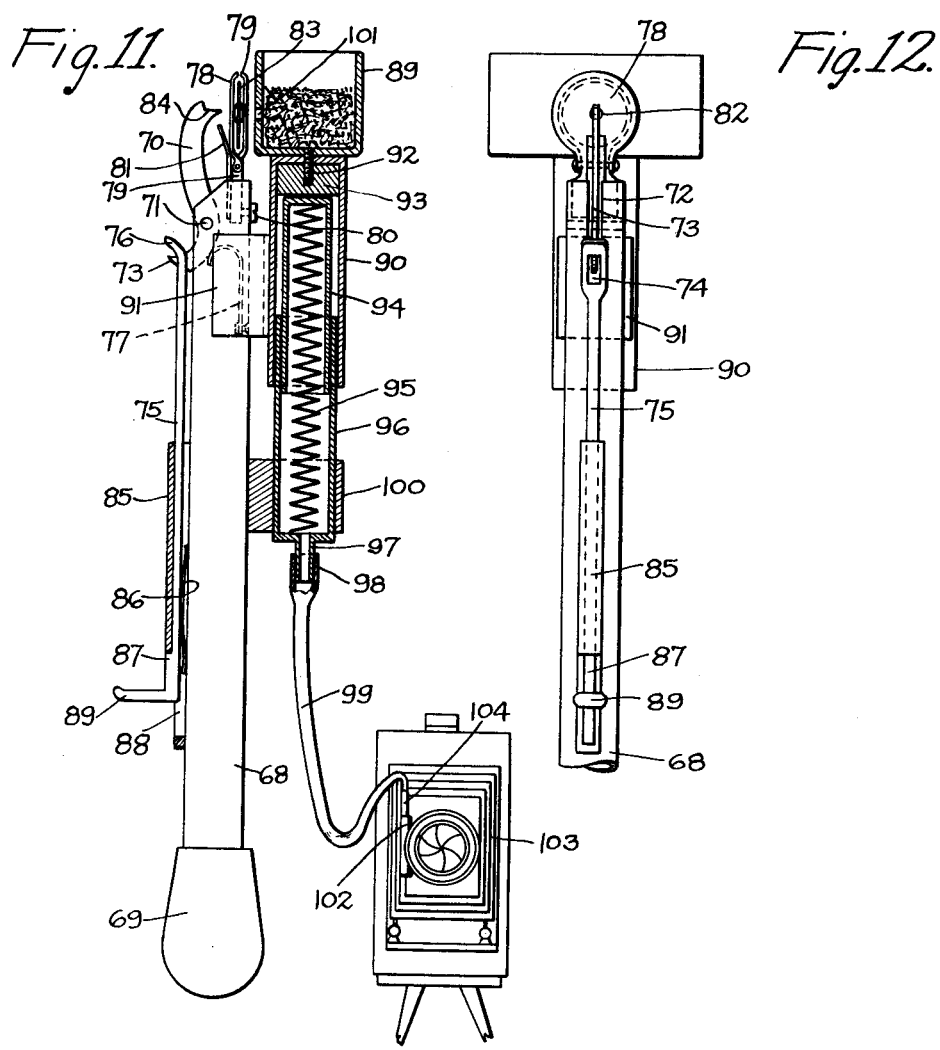

Patented Nov. 4, 1930

1,780,509

UNITED STATES PATENT OFFICE

WILLIAM T. SKINNER, OF LEONIA, NEW JERSEY

FLASH DEVICE

Application filed March 23, 1929. Serial No. 349,398.

This invention relates to flashlight devices for operation in connection with photography and in particular to a device arranged to be connected directly to the shutter operating portion of the camera in one type illustrated, and in another type, a portion of my invention is applied to an ordinary hand flash device as might be used by an amateur in taking pictures and in which synchronization of the shutter and flash are not needed.

A particular object of my invention is to provide a flashlight powder holder which, when operated will produce a glare for use in the taking of pictures and one which will automatically operate the camera shutter in synchronism with the flash so that the exposition of the film will take place at the instant that the flashlight powder is giving the greatest illumination.

A still further and more particular object of my invention is to provide a device of the character referred to in which the explosive force of the powder is made use of to operate the powder holder directly or a member associated therewith to compress air to operate the shutter of the camera situated at a point remote from the flash device.

I am aware that mechanical devices of one nature or another have been operated in connection with flash powder holders to automatically expose the film when the cap mechanism is operated, but this has been found very disadvantageous due to the fact that the defective cap which would not explode and ignite the powder charge would cause exposure of the film, the result being that the camera would have to be reset for the taking of the picture and time and material would consequently be wasted. My improved invention overcomes this objection inasmuch as it provides a device which will not expose the film unless the powder charge has ignited and built up sufficient air force by its explosive power to operate the shutter operating portion of the camera to expose the film.

My device is particularly adapted for the use of newspaper photographers and those engaged in the profession of making news and like photographs and where a small, practical flash gun is very necessary. The requirement of photographers makes it necessary that in most times in emergency cases, the tripod or camera support be dispensed with although the light conditions are such that in order to photograph persons or objects in motion, flashlight photography must be resorted to. Also by holding a camera in the hand while operating the flash, the shutter speed of one-fiftieth to one hundred and fiftieth part of a second must be used to overcome the vibration caused by the explosion of the flashlight powder. To accomplish such a result, means must be used to operate the lamp or gun in conjunction with the camera whereby some adjustment may be made on the means of setting off the shutter that will operate the shutter instantaneously at the time of the greatest illumination.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in side elevation of a flashlight holder having a flexible, tubular member connecting it with the shutter operating portion of a camera, part of the flashlight or flash powder holder being shown in section to illustrate the interior parts thereof.

Figure 2 is a top plan view of the mechanism illustrated in Figure 1.

Figure 3 is an enlarged section taken on the line 3—3 of Figure 1.

Figure 4 is a view in side elevation of a flashlight device employing a sparking mechanism similar to that illustrated in connection with the flash gun shown in Figures 1, 2 and 3, the particular construction illustrated being adapted for amateurs where the force of the flashlight powder is not utilized to operate a camera shutter.

Figure 5 is a view in perspective of the flash powder holder as it would appear when detached from its supporting member.

Figure 6 is an enlarged view looking toward the right, both in Figures 1 and 4 of the lower end of the mechanism and illustrating the finger piece which is used to operate the spark mechanism.

Figure 7 is a view in side elevation of the spark mechanism employed in connection with my improved flash device.

Figure 8 is a a view in rear elevation of the flash gun illustrated in Figure 1, the handle being removed.

Figure 9 is a view of the upper end of the flash gun illustrated in Figure 8, a part thereof being shown in section to show how the flash produced by the sparker is propelled through an opening in the powder holder for igniting the powder.

Figure 10 is a view in perspective of an adapter as positioned on the edge of a camera shutter holder and so arranged that it can be adjusted toward and away from the shutter lever so that the timing of the picture may be done accurately.

Figure 11 is a view in side elevation of a flashlight holder having a flexible tubular member which connects the same to the shutter operating portion of a camera, a part of the flashlight holder being shown in section to illustrate how the same operates, and Figure 12 is a view looking at the trigger side of the flashlight holder, the same being set for operation preparatory to igniting the powder in the magazine, Figures 11 and 12 both showing the use of a cap operated flash gun.

Referring to the drawings in detail, the flashlight holder consists of a handle 5 which is substantially U-shaped in cross section being slightly thickened in its lower portion as at 6 and having secured in its upper end, in any suitable manner, the guide ferrules 7, see Figures 8 and 9. The handle in its closed or forward side is provided adjacent its upper end with an opening 8 and in the opposite side wall 9 of its thickened lower portion 6, there are provided the slots 10, the extreme lower end of the handle being closed as at 11 and being provided adjacent its closed end with a pin 12 upon which is pivoted the retaining finger 13 which is used for a purpose to be hereinafter described.

The object in providing a U-shaped handle 5 is so that a standardized form of sparking device may be employed in connection with my invention. This sparking device, to the construction of which I make no claim, in general, consists of the members 14 and 15, the lower end of the latter 16 passing through a suitable finger latch 17 which is pivoted as at 18 to the member 14. The member 15 in its lower portion 16 is suitably recessed so that downward movement of the member 17 will cause the pin 19 carried therein to engage in the recess in the member 16 and draw the same downwardly against the action of the springs 20 and 21, which are connected to the member 14 and which oppose a relatively downward movement of the member 15. The upper end of the member 15 is provided with a pin 22 which operates in a concentric manner between two loose pieces 23 and 24 held within the corrugated spark wheel 25, the piece 24 being pivoted as at 26 in the member 14 and both pieces being frictionally arranged to engage the inner peripheral edge of the spark ring 25 so that upon a downward movement of the latch 17 under finger pressure, it will draw with it the member 15 and will impart a free turning movement to the members 23 and 24 but when the finger piece is released or is drawn down a certain distance, the member 15 will be automatically released and the springs will urge the piece 15 upward to cause movement of the spark disk 25 which, through the medium of its contact with a piece of flint 27 will throw a spark. The flint 27 is supported in the cylindrical end 28 of the spark device and this end 28 is arranged to fit snugly within the ferrule 7 so that the upper peripheral edge of the spark wheel is in alignment with an opening 29 in the powder holder 30. This opening 29 is also in alignment with the opening 8 hereinbefore referred to in the holder 5.

In order that the sparking device may be properly held within the holder 5, use is made of the retaining finger 13 upon which is cast or otherwise formed, a lug 31 which is arranged to seat within the lower end of the member 14, it being understood that the members 14 and 15 are substantially U-shaped in cross section and are of such a width as to permit their seating within the member 5. The pivot pins 19 and 18 are arranged to seat in the groove 10 formed on the inside wall of the holder 5 and thus the sparking mechanism is supported in exactly the position desired or so that the sparks emitting therefrom will pass through the openings 8 and 29 and will ignite the powder within the holder 30.

In order that the retaining finger or latch 13 may be maintained in its holding position, I provide a tubular handle piece 32 which is arranged to frictionally fit over the lower end of the handle 5 until its upper edge engages beneath the out-turned portion 33 provided on the end of the retaining finger 13. As illustrated in Figure 1, I may provide a suitable hand grip 34 which may be made of rubber or other suitable material for the lower end of the handle piece 32 but this may be dispensed with, if desired.

In order that the explosive force of the powder may be employed to operate the camera shutter, I have secured to the upper portion of the holder 5 or handle member, a socket piece 35, in which is positioned the upper end of a guide rod 36, the lower end thereof being supported in a suitable holder 37 which is also provided with tubular openings 38 in which is secured through the medium of the set screw 39, an intermediate cylinder 40. The guide rod 36 is secured in the holder 37 through the medium of a set screw 41 which is shown in Figure 8, the same being normally hidden when the flash mechanism is disposed in the handle. The holder 37 is secured to the handle in any suitable manner, such as by soldering. The holder 37 being spaced from the socket piece 35 will, of course permit a free sliding movement of a cylinder 42 which is soldered or otherwise secured at its upper end to the under surface of the powder holder 30. This cylinder is open at its lower end and is arranged to fit over the upper end of the intermediate cylinder 40, the extended portion 43 of the cylinder 42 being arranged to encompass the guide rod 36 and have free sliding movement thereon so that when the powder contained in the powder holder 30 is ignited, the force of the explosion will force the powder holder and the cylinder 42 downwardly, the same being guided in its downward movement by the rod 36 and this downward movement will cause a compression of the air in the intermediate cylinder 40 by reason of the fact that within said intermediate cylinder, I have provided an inner cylinder 44 which fits snugly in the cylinder 40 and is freely supported by the spring 45 contained within said cylinders 40 and 44. The upper end of the inner cylinder 44 is arranged to be normally urged against the under side of a washer 46 or its fastening element, the washer being secured through the medium of the fastening element to the under side of the powder holder 30 and providing a firm seat for the powder holder 30 on the upper end of the outer cylinder 42 to which, as before stated, it is secured.

The lower end of the intermediate cylinder 40 is enclosed through the medium of a plug or other closure 47 which carries at its center, an outwardly extending nipple 48 which is arranged to receive the end of a flexible air hose 49. The opposite end of hose 49 is secured over the nipple 50 provided on the upper end of a casing 51 in which operates a plunger 52, the lower end of which is arranged to engage the shutter latch 53 of the camera shutter 54. It, of course, will be understood that the adapter just described will be positioned on the shutter frame of a camera and the flexible tube 49 will convey air from the flash device so that the plunger 52 is operated by the pressure set up by the movement of the powder holder and its cooperating cylinders 42 and 44 when the flash is ignited with the result that the plunger 52 will operate the shutter lever 53 and cause exposure of the film, simultaneously with the ignition of the flash powder.

In many camera constructions and in particular, the type illustrated in connection with Figure 1, the shutter 54 is revolvable so that the shutter finger 53 may be moved toward or away from the plunger 52 to thereby vary the time of shutter operation and to place the same in perfect synchronism with the flash mechanism.

It will be noted that in the socket piece 35 there is provided an opening 55 which coincides with the opening 29 and the opening 8 hereinbefore referred to, all of the openings being arranged to permit passage of the sparks from the spark wheel into the powder holding box or receptacle 30.

In the form of my invention illustrated in Figures 4 and 5 and 6, the construction of the handle member is exactly as described with reference to the form shown in Figures 1, 2 and 3, the only exception being that the upper end of the handle 5, as illustrated in Figure 4, is enlarged slightly as at 55 to receive the straps 56 which fit closely thereover and are screwed down to a position on the enlarged portion 55 of the upper end of the handle until the opening 57 in the receptacle 58 is in alignment with the top edge of the spark wheel 25. In this particular construction, the strap of course, is extended and secured in any suitable manner to the receptacle 58, the openings 57 extending through the strap and through the wall of the receptacle and this form of my invention is particularly adapted for the use of amateurs where an efficient and positive operating flash mechanism is desired. The use of the same sparking mechanism ensures a proper flash, when desired, thus cutting down the unnecessary waste of film by exposure when cap operated flash mechanisms are employed.

In order to particularly adapt my automatic operating type of flashlight device to the operation of a camera shutter, I may further employ the adapter illustrated in Figure 10, and indicated by the numeral 57 and consisting of a cylinder 58 in which a plunger 59 is arranged to operate downwardly, the plunger being sustained in its upward position by resting upon the shutter operating lever 60 of the camera, the shutter frame being indicated by the numeral 61 and being provided with an elongated opening 62 at one side thereof in which an adjusting screw 63 is arranged to have sliding movement, the adjusting screw passing through a slot 64 in the adapter bracket 65 to which is secured the cylinder 58 referred to. This cylinder is provided in its upper end with an extension 66 which is arranged to receive the end 67 of an air tube that leads from the nipple 48 which provides an outlet at the bottom of the intermediate cylinder 40 of the flash mechanism. The adapter bracket 65 is provided with a depending stop 68 which underlies the plunger 59 or piston to prevent its dropping out of the cylinder 58 when the shutter 60 has been moved down by operation of the plunger or for some other reason.

It is quite evident that through the medium of the adjustable screw 63, the adapter bracket 65 may be adjusted relatively to the frame piece 61 with the result that the timing of the flash may be varied and the synchronization of the lens operation and maximum flare of the flash mechanism may be obtained.

Referring to the form of my invention as illustrated in Figures 11 and 12 in which form is shown the use of a different firing mechanism, the flashlight holder consists essentially of a handle member 68 which at its lower end may be provided with a rubber or other similar, non-slipping hand hose 69, the handle 68 being of tubular formation and being arranged to hold in its upper end, a cap exploding trigger 70, the same being pivoted as at 71 in the opposite side wall of the handle 68.

The handle 68 is provided with a slot 72 through which extends the lower end 73 of the trigger, this lower end being arranged to seat in an eye 74 formed in the upper end of a trigger bar 75, the extreme upper end of the trigger bar being turned outwardly as at 76 to permit operation of the latch by the trigger spring 77. This spring is disposed inside the handle and is arranged to bear against the lower end of the trigger 70 whereby the upper end thereof is caused to strike within the cap holder 78. The cap holder 78 consists of a plurality of jaw members, one of which is extended as at 79 to be positioned within the handle 68 and secured therein through the medium of a suitable screw 80, this projection also carrying the leaf spring 81 which bears against the outer jaw of the cap holder which is pivoted as illustrated to the portion 79.

Both the jaw members of the cap holder are perforated as at 82 to provide aligned openings which will normally be in alignment with the ignition charge of the cap 83 which is held between the jaws and in position to be exploded through the medium of the sharp point 84 of the upper end of the trigger 70. The lower portion of the trigger bar 75 is housed within a channel 85 which is secured by soldering or other means to the outer surface of the handle and is arranged to receive for loose movement therein the trigger bar, the lower end of the same being normally urged outward by the spring 86 so that a lip 87 formed by undercutting the trigger bar 75 adjacent its lower end may engage the lower edge of the cut away portion 88 of the channel so that the trigger bar is maintained in depressed position until the finger portion 89 thereof is moved inwardly to permit operation of the trigger for ignition of the powder charge.

The powder magazine consists of an elongated receptacle 89 carried on the upper end of a piston housing 90, this piston housing being provided with a suitable guide 91 which is arranged to fit about one side of the handle 68 to have sliding movement thereon. The guide 91 may be secured to the housing 90 in any suitable manner such as by welding. The housing 90 and magazine 89 are secured together through the medium of a screw 92 which passes into a filler block 93 disposed in the interior of the housing 90.

Within the housing 90 there is provided a freely operating floating piston 94 in which is disposed a coil spring 95 which at its lower end rests on the bottom of a cylinder 96 in which the piston 94 has free sliding movement. The lower end of the cylinder 96 is provided with an air outlet 97 to which is releasably secured the end 98 of an air tube 99, the lower end of the cylinder being suitably held in a cylinder block 100 which is secured in any suitable manner to the handle 68.

It is quite evident therefore, that when the trigger has been set and a cap inserted in the cap holder, release of the trigger bar will permit the trigger to ignite the cap, the ignition passing through an ignition port 101 in the powder magazine 89 to ignite the powder contained therein to cause an illuminating flash. This explosion of the powder will, of course, create sufficient energy to depress the piston housing 90 and also the piston 94 disposed therein, thereby causing depression of the air inside the piston and cylinder 96 and causing the air to pass through the tube 99 to the shutter operator 102 of the camera 103. It is believed that the shutter operating mechanism, being well known, need not be illustrated and it will be sufficient to say that the end of the tube 99 may be provided with a short piece of metal tubing 104 which can be inserted into the shutter operator 102 to permit the compressed air to operate upon the shutter operating mechanism.

It is quite evident, therefore, that unless the powder explodes to provide the illuminating glare, the powder magazine and piston will not be depressed and consequently the camera will not be operated to expose the film. If, on the other hand, the explosion takes place, instantaneously therewith, the film is exposed and in this manner the non-explosion of a cap or the non-operation of any other part of the mechanism incidental to the ignition of the cap will not cause exposure of the film and consequently the expense of taking flashlight pictures will be reduced and also the time of taking pictures will be reduced due to the positive nature of the flashlight holder as used in connection with the camera.

It is also evident that in my improved construction the various mechanisms illustrated make up an efficiently operating flash mechanism and one which can be depended upon, it being noted particularly that the flint operating mechanism may be employed in any kind of weather to produce a positive flash and the exposure will not be made of the film unless powder is ignited and by its force, depresses the powder holder.

It is to be understood that in both the forms of my invention in which the operation of the camera shutter is controlled by the force of the explosion, that the inner cylinders 44 and 94 may be entirely dispensed with because, as illustrated in Figure 1, the downward movement of the outer cylinder 42 over the cylinder 40 will provide sufficient compression of air to operate the camera and likewise operation of cylinder 90 over cylinder 96 will provide the compression desired, but I have found in practical use that the inner cylinders 44 and 94 as illustrated in Figures 1 and 11 respectively, provide a greater compression and a more positive and quicker operation of the camera shutter because the possibility of air leakage has been eliminated to a great extent and compression is more quickly built up.

This application contains subject matter disclosed in my abandoned application, Serial No. 250,470, filed January 30, 1928.

While I have illustrated and described my invention with some degree of particularity, I realize that in practice various alterations therein may be made without departing from the spirit of the invention or the scope of the appended claims.

What I claim is:—

1. A flashlight device comprising a handle, an ignition device mounted on said handle, a stationary cylinder secured to said handle, a movable cylinder telescoping said stationary cylinder, an open top flash powder holder mounted to move with said movable cylinder, a helical spring within said cylinders, and a flexible air hose connected to said stationary cylinder and adapted to be connected to the film exposure control mechanism of a camera.

2. A flashlight device for a camera comprising an open top flash powder holder member, a handle member, a cylinder secured to one of said members, a piston within said cylinder and secured to said other member, spring means normally holding said piston away from the bottom of the cylinder, and a flexible air hose connected to said cylinder and adapted to be connected to the film exposure control mechanism of a camera, whereby the reaction of the explosion of the powder in said holder member against the surrounding air forces air out of said cylinder through said hose to operate said film exposure control mechanism.

3. In a flashlight device for a camera, a handle, ignition mechanism mounted thereon, first and second socket pieces secured to said handle, a guide rod in said socket pieces, a sleeve slidable on said guide rod, an outer movable cylinder secured to said sleeve, an open top powder container secured to said cylinder, a stationary cylinder fixed to said lower socket piece and disposed within said movable cylinder, a movable inner cylinder within said cylinders, a helical spring within said fixed cylinder and said inner movable cylinder, and a flexible air hose connected to said stationary cylinder and adapted to be connected to the film exposure control mechanism of a camera.

Signed at New York city in the county of New York and State of New York this 20th day of March, A. D. 1929.

WILLIAM T. SKINNER. [L. S.]